US009826446B2

United States Patent
Venkatraman (10) Patent No.: US 9,826,446 B2
(45) Date of Patent: Nov. 21, 2017

(54) DOWNLINK POWER MANAGEMENT (71) Applicant: Intel Corporation, Santa Clara, CA (US)

(72) Inventor: Shankarakrishnan Venkatraman, Santa Ana, CA (US)

(73) Assignee: Intel Corporation, Santa Clara, CA (US)

( * ) Notice: Subject to any disclaimer, the term of this patent is extended or adjusted under 35 U.S.C. 154(b) by 70 days.

(21) Appl. No.: 14/767,833

(22) PCT Filed: Mar. 13, 2014

(86) PCT No.: PCT/IB2014/001169
§ 371 (c)(1),
(2) Date: Aug. 13, 2015

(87) PCT Pub. No.: WO2014/140907
PCT Pub. Date: Sep. 18, 2014

(65) Prior Publication Data
US 2016/0007254 A1 Jan. 7, 2016

Related U.S. Application Data (60) Provisional application No. 61/794,404, filed on Mar. 15, 2013.

(51) Int. Cl.
*H04W 36/04* (2009.01)
*H04W 16/08* (2009.01)
(Continued)

(52) U.S. Cl.
CPC .......... *H04W 36/04* (2013.01); *H04W 16/08* (2013.01); *H04W 16/10* (2013.01); *H04W 36/22* (2013.01);
(Continued)

(58) Field of Classification Search
CPC ..... H04W 36/04; H04W 16/10; H04W 36/22; H04W 52/244; H04W 36/30;
(Continued)

(56) References Cited

U.S. PATENT DOCUMENTS 7,907,954 B2 * 3/2011 Poyhonen ............. H04W 88/06
345/581
8,040,800 B2 * 10/2011 Froment ............... H04L 29/125
370/230
(Continued)

FOREIGN PATENT DOCUMENTS

FI WO 2012146274 A1 * 11/2012 ............ H04W 24/10
GB 2311191 A 9/1997
(Continued)

OTHER PUBLICATIONS

R. Madan, J. Borran, A. Sampath, N. Bhushan, A. Khandekar and T. Ji, "Cell Association and Interference Coordination in Heterogeneous LTE-A Cellular Networks," in IEEE Journal on Selected Areas in Communications, vol. 28, No. 9, pp. 1479-1489, Dec. 2010. doi: 10.1109/JSAC.2010.101209.*

(Continued)

*Primary Examiner* — Andrew Lai
*Assistant Examiner* — Hoyet H Andrews, III
(74) *Attorney, Agent, or Firm* — Schwegman Lundberg & Woessner, P.A.

(57) ABSTRACT

A system and related method for increasing or decreasing the range of a pico cell station. The system and method determine triggers for dynamic range change, measure operational conditions and make a change reactive to operational conditions. Range increase may be implemented to address a coverage hole. Range decrease may be implemented to address holdover attempts. Range changes are (Continued)

implemented by changing transmission power, reference signal received power and/or cell reselection thresholds.

17 Claims, 8 Drawing Sheets

(51) Int. Cl.
  H04W 36/22 (2009.01)
  H04W 48/20 (2009.01)
  H04W 52/24 (2009.01)
  H04W 16/10 (2009.01)
  H04W 36/30 (2009.01)
  H04W 84/04 (2009.01)

(52) U.S. Cl.
  CPC .......... *H04W 36/30* (2013.01); *H04W 48/20* (2013.01); *H04W 52/244* (2013.01); *H04W 84/045* (2013.01)

(58) Field of Classification Search
  CPC .......... H04W 84/045; H04W 72/1226; H04W 72/1247; H04W 72/085; H04W 84/042; H04W 52/14; H04W 72/082; H04W 52/30; H04W 28/02; H04W 28/18; H04W 24/02; H04W 24/10; H04W 16/04; H04W 88/08; H04L 5/0073; H04B 17/0082; H04B 7/00
  See application file for complete search history.

(56) References Cited

U.S. PATENT DOCUMENTS

| | | | | |
|---|---|---|---|---|
| 2005/0129009 | A1* | 6/2005 | Kitchin | H04L 12/12 370/389 |
| 2005/0215274 | A1* | 9/2005 | Matson | G06F 1/3203 455/522 |
| 2007/0140157 | A1* | 6/2007 | Fu | H04W 48/18 370/318 |
| 2007/0140159 | A1* | 6/2007 | Eronen | H04L 12/12 370/328 |
| 2007/0297438 | A1* | 12/2007 | Meylan | H04W 52/0225 370/445 |
| 2008/0212508 | A1* | 9/2008 | Morimoto | H04W 52/0235 370/311 |
| 2008/0227444 | A1* | 9/2008 | Salomone | H04L 65/80 455/419 |
| 2008/0242313 | A1* | 10/2008 | Lee | H04W 52/0235 455/456.1 |
| 2010/0039971 | A1* | 2/2010 | Lor | H04W 52/0274 370/311 |
| 2010/0093288 | A1* | 4/2010 | Pan | H04W 52/0209 455/68 |
| 2010/0174808 | A1* | 7/2010 | Dabagh | G06F 1/3203 709/221 |
| 2010/0273489 | A1 | 10/2010 | Narasimha | |
| 2010/0278088 | A1* | 11/2010 | Goldman | H04L 1/1671 370/311 |
| 2012/0020393 | A1* | 1/2012 | Patil | H04W 76/068 375/222 |
| 2012/0028674 | A1* | 2/2012 | Zhao | H04W 24/02 455/522 |
| 2014/0256318 | A1* | 9/2014 | Ekici | H04W 52/0235 455/435.1 |

FOREIGN PATENT DOCUMENTS

| | | | | |
|---|---|---|---|---|
| GB | 2482734 A | | 2/2012 | |
| SE | WO 2012150880 A1 | * | 11/2012 | .......... H04W 36/08 |
| WO | WO 2012064593 A1 | * | 5/2012 | .......... H04L 1/0026 |
| WO | WO-2012/154100 A1 | | 11/2012 | |
| WO | WO-2014/140907 A2 | | 9/2014 | |
| WO | WO-2014/140907 A3 | | 9/2014 | |

OTHER PUBLICATIONS

R1-130001, 3GPP TSG RAN WG1 Meeting #72, S Saint Julian's, MALTA, Jan. 28-Feb. 1, 2013, Title: Final Report of 3GPP TSG RAN WG1 #71 v1.0.0 (New Orleans, USA, Nov. 12-16, 2012).*

A. Khoryaev, A. Chervyakov, M. Shilov, S. Panteleev and A. Lomayev, "Performance analysis of dynamic adjustment of TDD uplink-downlink configurations in outdoor picocell LTE networks," 2012 IV International Congress on Ultra Modern Telecommunications and Control Systems, St. Petersburg, 2012, pp. 914-921. doi: 10.1109/ICUMT.2012.6459791.*

R Madan et al., titled R. Madan, J. Borran, A. Sampath, N. Bhushan, A. Khandekar and T. Ji, "Cell Association and Interference Coordination in Heterogeneous LTE-A Cellular Networks," in IEEE Journal on Selected Areas in Communications, vol. 28, No. 9, pp. 1479-1489, Dec. 2010, doi: 10.1109/JSAC.2010.101209, (MADAN hereinafter).*

A Khoryaev et al., titled, "Performance analysis of dynamic adjustment of TDD uplink-downlink configurations in outdoor picocell LTE networks," 2012 IV International Congress on Ultra Modern Telecommunications and Control Systems, St. Petersburg, 2012, pp. 914-921, doi: 10.1109/ICUMT.2012.6459791.*

"International Application Serial No. PCT/IB2014/001169, International Search Report dated Mar. 20, 2015 ", 4 pgs.

"International Application Serial No. PCT/IB2014/001169, Written Opinion dated Mar. 20, 2015 ", 6 pgs.

* cited by examiner

FIG. 1

DYNAMICALLY REACTING TO DEPLOYMENT SCENARIO

| | PICO-PICO | | MACRO-PICO |
|---|---|---|---|
| NEED TO INCREASE RANGE | 1 | 2 | 3 |
| | COVERAGE HOLE<br>• POOR NEIGHBOR SIGNAL FROM CELL EDGE UEs<br>• DETECTION OF UEs IN ADDITIONAL AREA<br>• INCREASE Ptx, RSRP, RE<br>• IMPROVES OVERALL COVERAGE. | | PICO DEPLOYED FOR CAPACITY<br>• STRONG NEIGHBOR MACRO SIGNAL<br>• DETECTION OF UEs IN ADDITIONAL AREA<br>• INCREASE Ptx, RSRP, RE<br>• REDUCES PICO-MACRO INTERFERENCE (DL & UL) |
| NEED TO REDUCE RANGE | 4 | 5 | |
| | OPTIMAL PICO SIZE<br>• PICO EDGE SIGNAL & NEIGHBOR EDGE SIGNAL >> REQUIRED SIGNAL<br>• DECREASE Ptx, RSRP, CELL RESELECTION THRESHOLDS<br>• REDUCES INTERFERENCE | PICO SPILLOVER<br>• HIGH CELL EDGE UE GEOMETRY, LOW SOJOURN TIME ON PICO<br>• MACRO SIGNAL > THRESHOLD<br>• DECREASE Ptx, RSRP, CELL RESELECTION THRESHOLDS<br>• REDUCES HO ATTEMPTS | |

- Case 1 & 2 : Coverage Hole
  - Trigger T1
    - Measurements
      1. RSRPUEedge-N < RSRPUEedge-S - ΔAND
      2. NEIGHBOR CELL RSRP < RSRPThresh-N
      3. Increment $N_{triggers}$
    - Condition
      - $N_{triggers} / N_{total\_atts} > T1_{thresh}$
      - Reset $N_{triggers}$ and $N_{total\_atts}$ after time $T_{T1}$
  - Trigger T2
    - Measurements
      - Detection of UEs in surrounding area
      - Increment $N_{triggers}$
    - Condition
      - $N_{triggers} / N_{total\_measures} > T2_{thresh}$
      - Reset $N_{triggers}$ and $N_{total\_measures}$ after time $T_{T2}$
  - T1 AND T2 indicates coverage hole
  - Mapped to Action U

- Case 3 : HotSpot on Same Carrier as Macro
  - Trigger T3
    - Measurements
      1. RSRPUEedge-N >= RSRPUEedge-S - Δ
      2. Is Neighbor a Macro? AND
      3. Increment $N_{triggers}$
    - Condition
      - $N_{triggers} / N_{total\_atts} > T3_{thresh}$
      - Reset $N_{triggers}$ and $N_{total\_atts}$ after time $T_{T3}$
  - Trigger T2
    - Measurements
      - Detection of UEs in surrounding area
      - Increment $N_{triggers}$
    - Condition
      - $N_{triggers} / N_{total\_measures} > T2_{thresh}$
      - Reset $N_{triggers}$ and $N_{total\_measures}$ after time $T_{T2}$
  - T3 AND T2 indicates need for additional Pico coverage
  - Mapped to Action U

FIG. 5

- Case 4 : Optimal Pico Size
- Trigger T4
  - Measurements
    1. $RSRP_{UE-S} > RSRPThresh\text{-}S\text{-}Max$, AND $RSRP_{UE-N} > RSRPThresh\text{-}N\text{-}Max$
    2. Increment $N_{triggers}$
  - Condition
    - $N_{triggers} / N_{total\_atts} > T4_{thresh}$
    - Reset $N_{triggers}$ and $N_{total\_atts}$ after time $T_{T4}$
- T4 indicates excessive Pico coverage
  - Mapped to Action D

- Case 5 : Pico spillover
- Trigger T5
  - Measurements
    1. $RSRP_{UEedge-N} > RSRPThresh\text{-}N\text{-}Min$ AND Neighbor is a Macro
    2. Neighbor is a Macro
    3. Increment $N_{triggers}$
  - Condition
    - $N_{triggers} / N_{total\_atts} > T5_{thresh}$
    - Reset $N_{triggers}$ and $N_{total\_atts}$ after time $T_{T5}$
- Trigger T6
  - Measurements
    - $UE_{sojourntime} < SojournTimeThresh$
    - Increment $N_{triggers}$
  - Condition
    - $N_{triggers} / N_{total\_atts} > T6_{thresh}$
    - Reset $N_{triggers}$ and $N_{total\_atts}$ after time $T_{T6}$
- T5 AND T6 indicates excessive Pico coverage
  - Mapped to Action D

FIG. 6

- Action : Moving Upward
  - Step 1 : Cell size increase
    - Ptx = min(Ptx + P$_{UP}$, Ptx$_{max}$)
    - Update refSigPower in serving cell
  - Step 2 : If Ptx= Ptx$_{max}$ Cell attach increase
    - RSRP = min(RSRP + P$_{UP}$, RSRP$_{max}$)
    - Update refSigPower in serving cell
  - Step 3 : If RSRP = RSRP$_{max}$ Range Extension
    - RE = min(RE + P$_{UP}$, RE$_{max}$)
    - RxLevMin = RxLevMin - RE
    - Notify SON of new RxLevMin (to be used by other cells)
  - Step 4 : Clear all trigger counters

- Action : Moving Downward
  - Step 1 : Decrease cell reselection threshold
    - RE = min(RE - P$_{DOWN}$, 0)
    - RxLevMin = RxLevMin + RE
    - Notify SON of new RxLevMin (to be used by other cells)
  - Step 2 : If RE=0 Cell attach decrease
    - RSRP = max(RSRP - P$_{DOWN}$, RSRP$_{min}$)
    - Update refSigPower in serving cell
  - Step 3 : Cell size decrease
    - Ptx = max(Ptx - P$_{DOWN}$, Ptx$_{min}$)
    - Update refSigPower in serving cell
  - Step 4 : Clear all trigger counters

DOWNLINK POWER MANAGEMENT

This application is a U.S. National Stage Filing under 35 U.S.C. 371 from International Application No. PCT/IB2014/001169, filed Mar. 13, 2014 and published in English as WO 2014/104907 on Sep. 18, 2014, which claims the benefit of priority to U.S. Provisional Patent Application Ser. No. 61/794,404, filed Mar. 15, 2013, each of which is incorporated herein by reference in its entirety.

BACKGROUND OF THE INVENTION

1. Field of the Invention

The present invention relates in general to radio communication systems for wireless networks. The present disclosure relates to communication networks including a plurality of pico cells. Specifically, aspects of the present disclosure relate to the management of pico cell communication.

2. Description of the Prior Art

Heterogeneous networks combine macro and pico base stations within a wireless communication system. In general, locating several pico base stations within the cell coverage of a macro base station will increase the capacity of the network. However, interference between the macro and pico base stations must be managed. Macro deployments require Radio Frequency site planning and post deployment optimization to transmit power, provide antenna tilts and azimuths and the like. Such operations are difficult to scale as the number of small cells increase. Pico environments can also vary significantly based on Macro-Pico carrier choices, deployment (outdoor, indoor) and user densities. Basic parameters relating to cell size and coverage need to be determined dynamically to make small cell deployments easier and scalable. Accordingly, what is needed is a better way to manage pico environments. The present invention provides for such capability.

SUMMARY OF THE INVENTION

The present invention is a system and related method for managing transmissions among a plurality of pico cells in a communication environment. The system and method are configured to react dynamically to necessary changes in signal strength deployment based on whether there is a need to increase the range of transmission/reception or decrease the range of transmission/reception. Those situations for which range increase is needed include a coverage hole for adjacent pico cells and for macro and pico cells that are adjacent to one another, and when a macro adjacent to a pico has a strong signal that must be distinguished for local User Devices (UE). Those situations for which range decrease is needed include when there is a desire for minimal adjacent pico cells to interfere with one another and in a macro-pico interface when the pico cell signal may interfere with the macro cell signal.

In those situations in which a range increase is desired, the system of the invention is configured to increase one or more of signal transmission power (Ptx), Referenced Signal Received Power (RSRP) and Cell reselection thresholds (RE). That either improves overall coverage or reduces macro-pico interference. In those situations in which a range decrease is desired, the system is configured to decrease one or more of Ptx, RSRP and RE. Such reduction can reduce interference and Handover (HO) attempts. This is accomplished by defining triggers based on measured conditions associated with any of coverage holes, hot spot interference, pico size optimization, and cell spillover. Based on the defined triggers, an increase or a decrease is initiated. These and other advantages will become apparent upon review of the following information.

DETAILED DESCRIPTION OF THE INVENTION

The present invention is a system and related method for managing pico cells in a signal transmission environment. FIGS. 1-7 illustrate and describe pico cell arrangements and conditions for initiating antenna transmission and reception functionality range increase or decrease. The figures provide the detailed description of the invention in which triggers are defined, conditions of operation are measured and an increase or a decrease of one or more of Ptx, RSRP, REs is implemented for operational improvements based on measurements carried out. The drawings further show and describe specific ways of conducting a review and carrying out one or more implementations of dynamically carrying out range changes and reactive actions.

Figure 1:
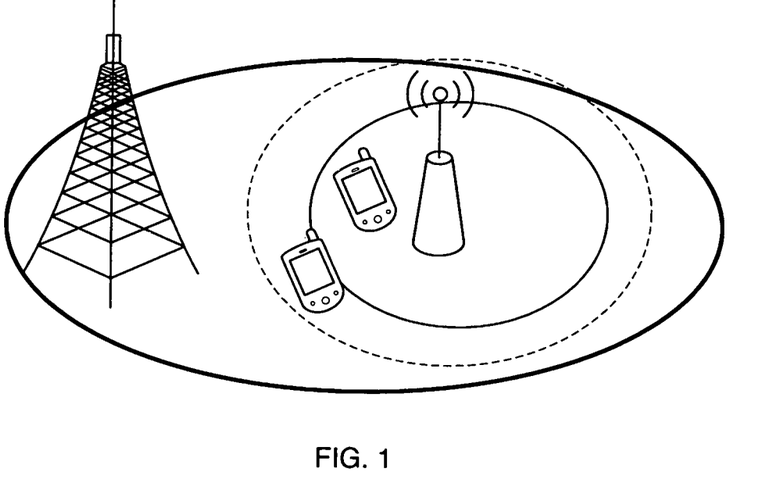
FIG. 1 is a representation of a pico cell antenna tower adjacent to a macro cell antenna tower.
Figure 2:
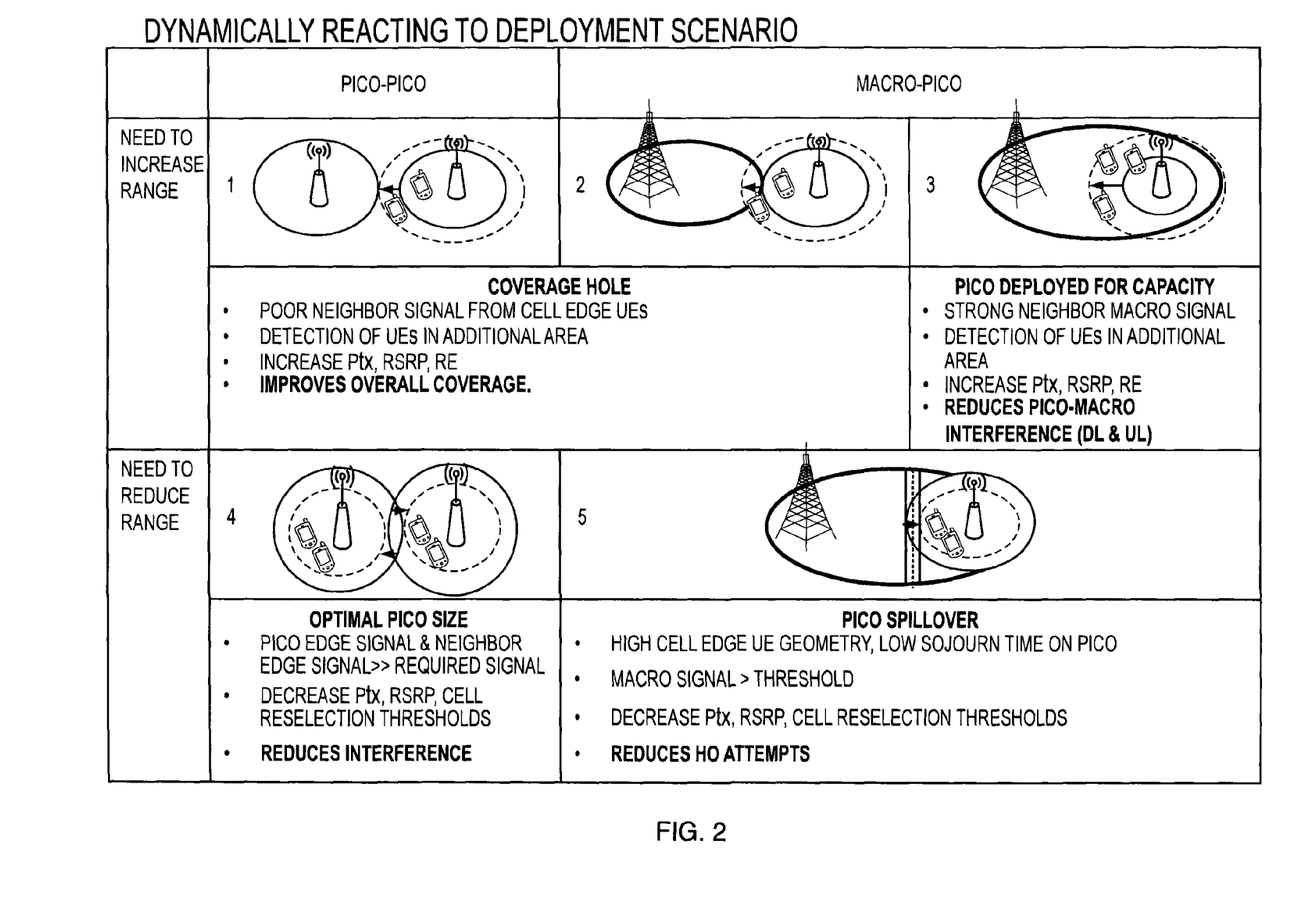
FIG. 2 is a representation and description of scenarios in which pico cell range is increased or decreased.
Figure 3:
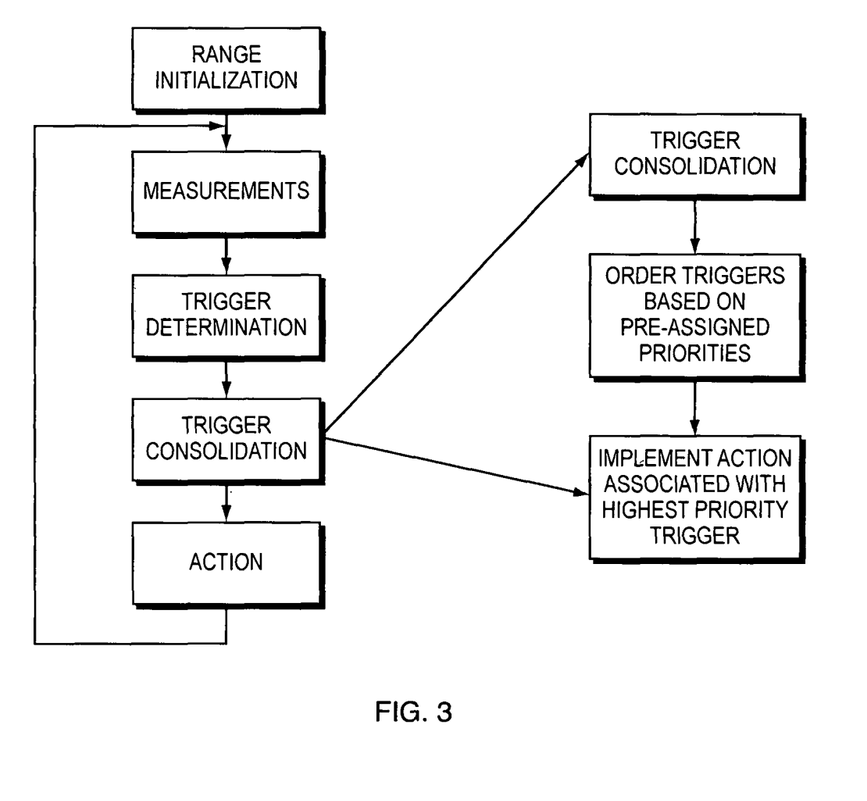
FIG. 3 is at flow diagram representing steps of the method for determining pico cell range increase or decrease triggers.
Figure 4:
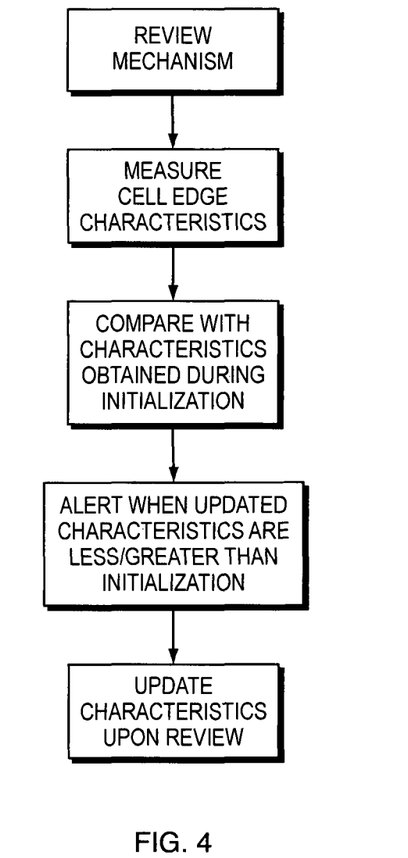
FIG. 4 is a flow diagram representing steps of the method for implementing pico cell range increase or decrease.
Figure 5:
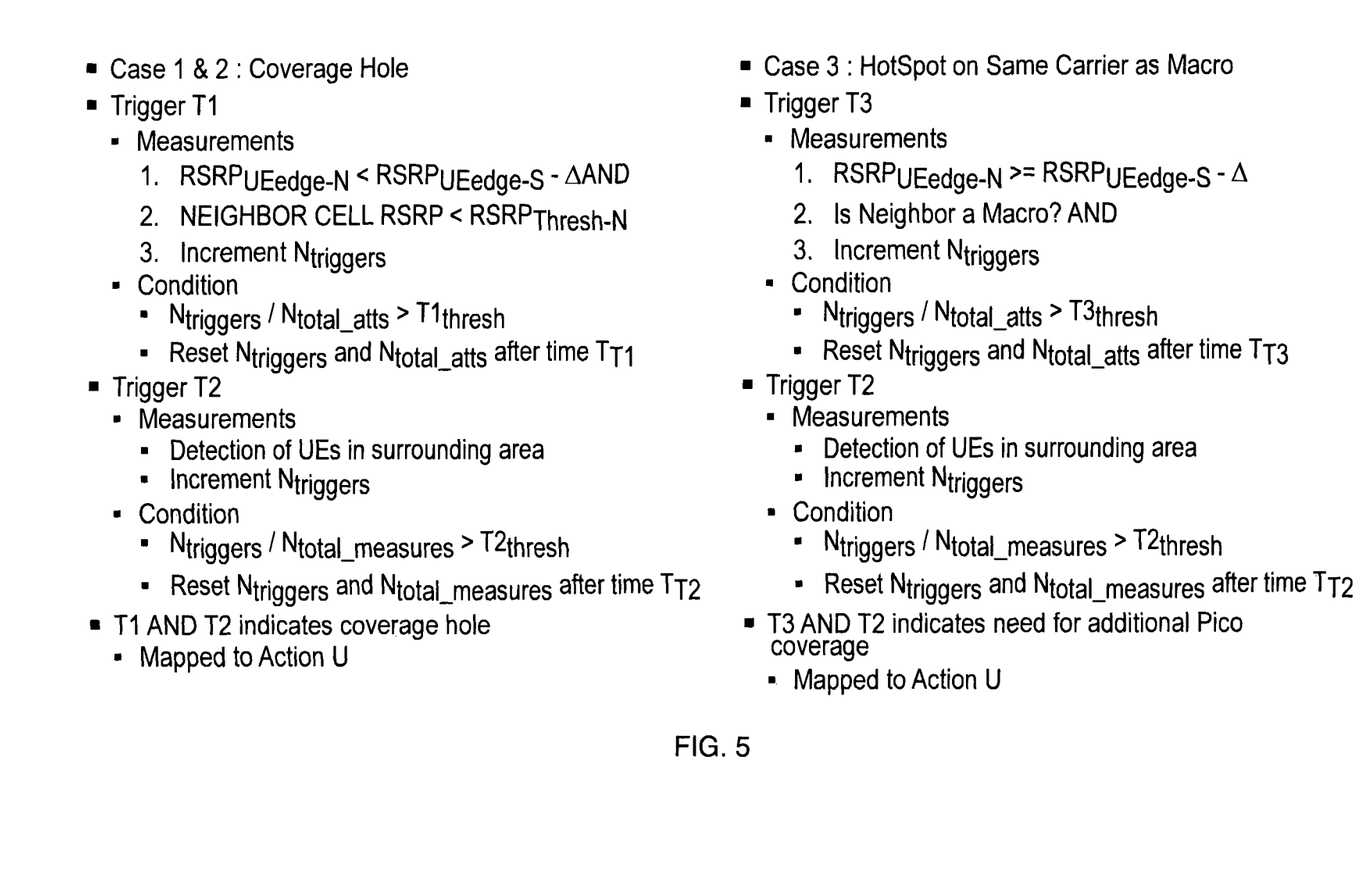
FIG. 5 is a description of trigger conditions and range modification implementations.
Figure 6:
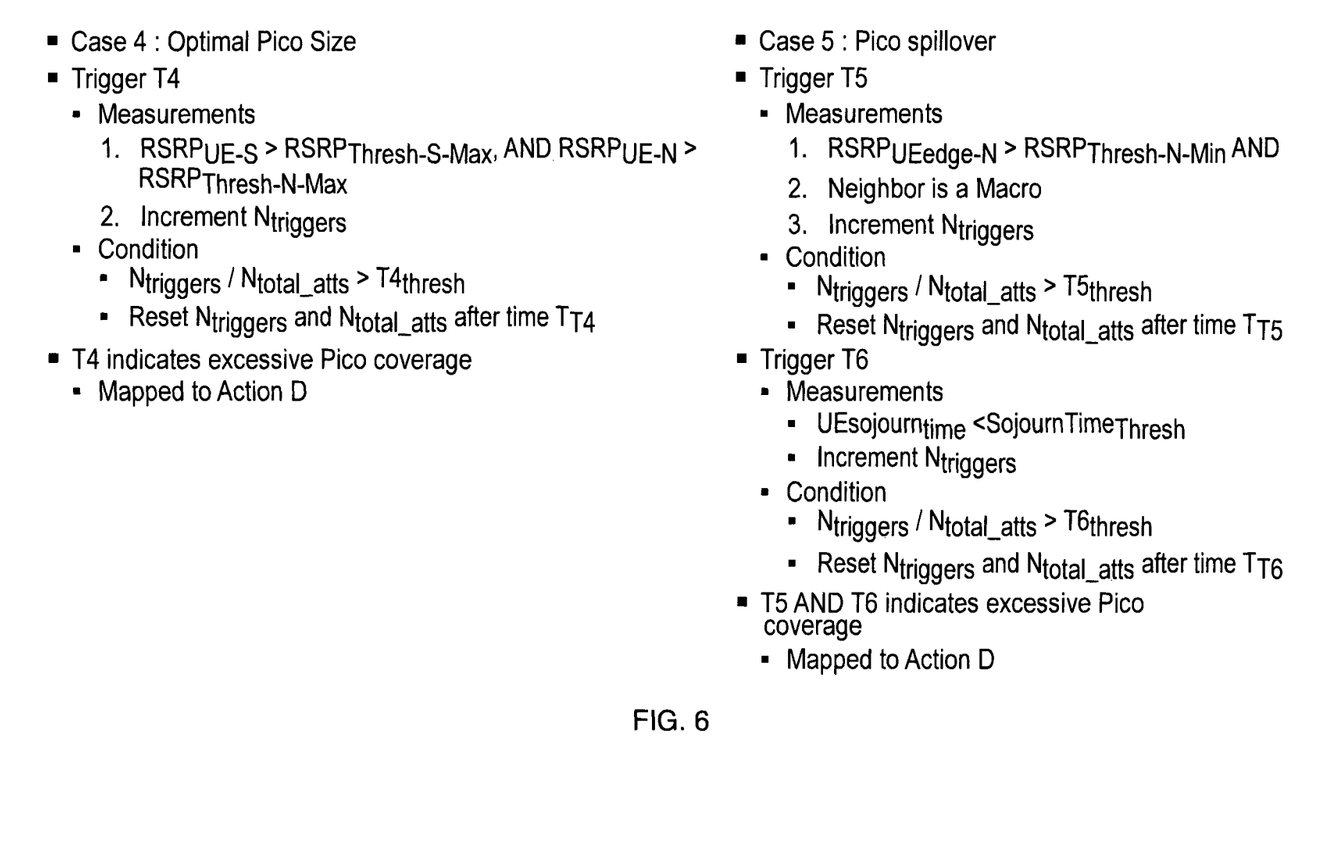
FIG. 6 is a continuation of FIG. 5 with additional descriptions of trigger conditions and range modification implementations.
Figure 7:
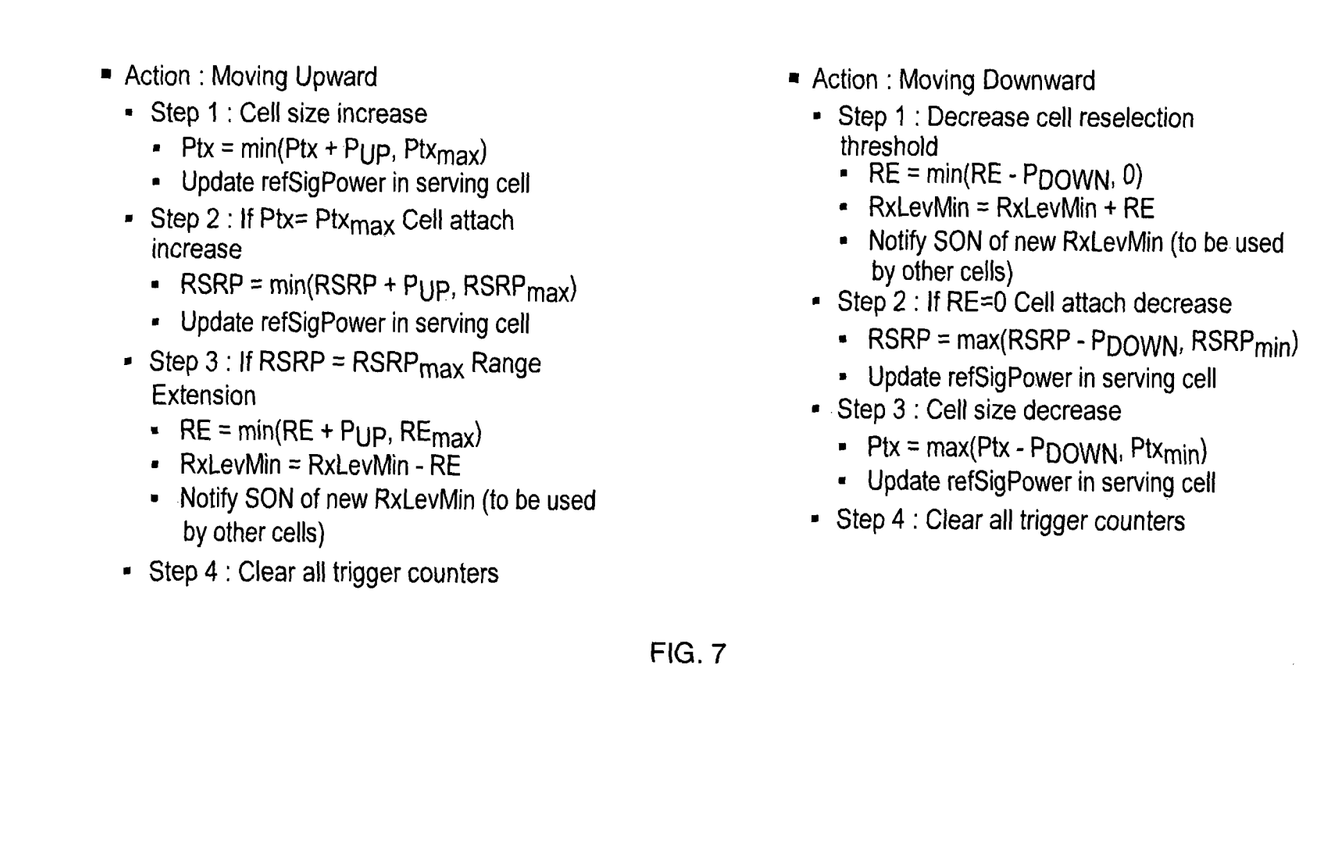
FIG. 7 is a description of range increase and range decrease steps.
Figure 8:
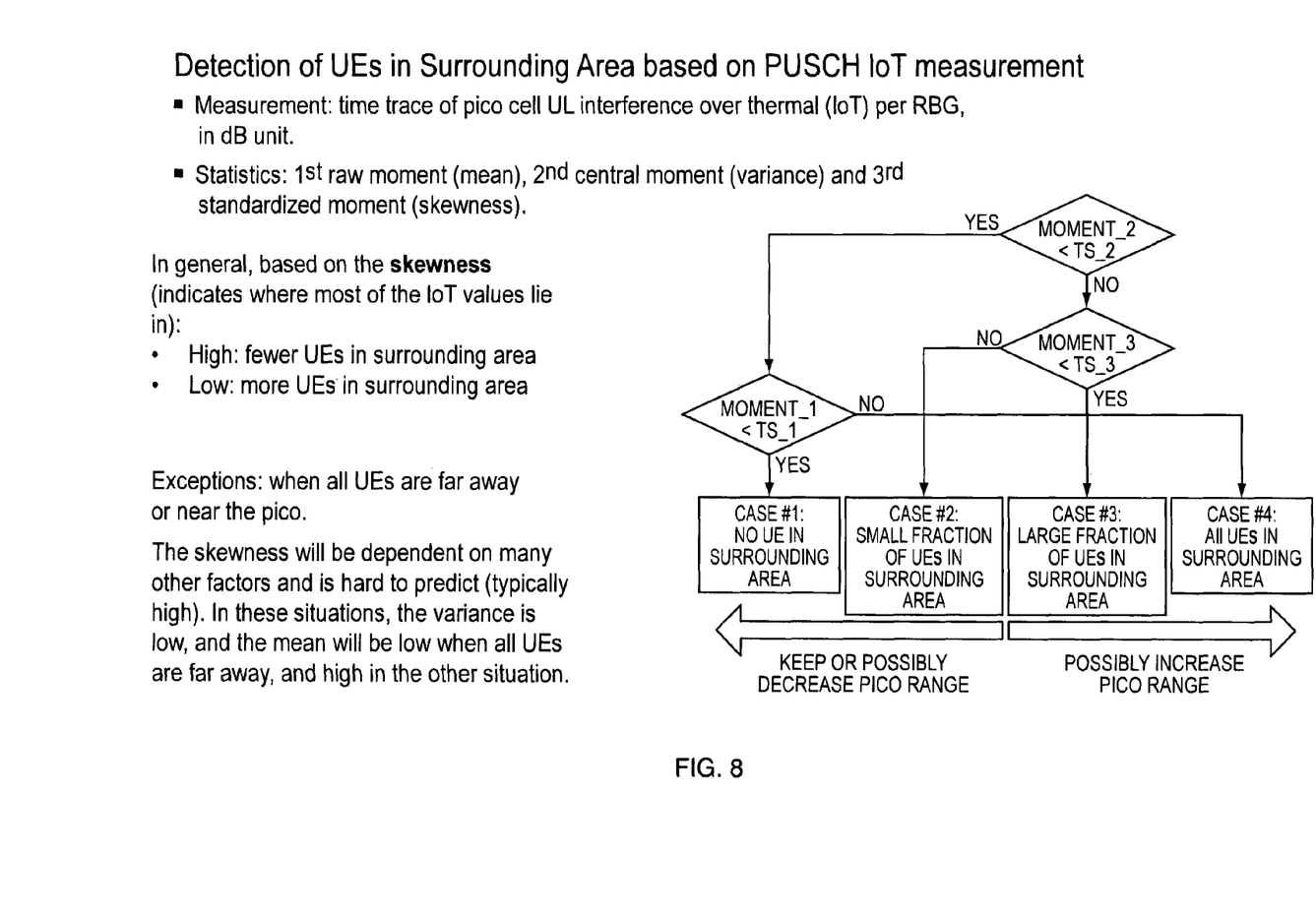
FIG. 8 is a description of the analysis of UL interference over thermal for UEs.

With reference to FIG. 8, the detection of the UEs for implementation can be described as:

Measurement of avg. PUSCH IoT>IoT Thresh in silence intervals
  Avg. PUSCH IoT>IoT Thresh
  Variance and Avg. Peak PUSCH IoT
  Details in the next slide.
Based on detecting neighbor cell PRACH attempts
  $N_{RACH-N}$>x (per hour)
  $P_{RACH\_Offset}$=(Prx_Preamble−P0_Premble$_s$)−(P0_Preamble$_N$−P0_Preamble$_s$)
  If $P_{RACH\_Offset}$>$P_{RACH\_Offset\_Thresh}$ While illustrative embodiments have been disclosed and discussed, one skilled in the relevant art will appreciate that additional or alternative embodiments may be implemented within the spirit and scope of the present disclosure. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with the scope of variations to the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without user input or prompting, whether these features, elements or steps are included or are to be performed in any particular embodiment. Moreover, unless specifically stated otherwise, or otherwise understood within the context as used, is generally intended to convey utilization of the conjunction "or" in enumerating a list of elements does not limit the selection of only a single element and can include the combination of two or more elements.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer-readable medium storing the computer executable components, such as a CD-ROM, DVD-ROM, or network interface. Further, the component and/or data can be included in a single device or distributed in any manner. Accordingly, general purpose computing devices may be configured to implement the processes, algorithms and methodology of the present disclosure with the processing and/or execution of the various data and/or components described above. Alternatively, some or all of the methods described herein may alternatively be embodied in specialized computer hardware. In addition, the components referred to herein may be implemented in hardware, software, firmware or a combination thereof.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. In a heterogeneous cellular network comprising at least one macro cell and one or more pico cells wherein the one or more the pico cells each have coverage regions that are configurable to at least partially overlap a coverage region of the macro cell, an apparatus for an enhanced Node B (eNB) comprising:
    processing circuitry to configure a pico cell of the one or more pico cells to:
        adjust an operating range of the pico cell in response to one or more trigger conditions to dynamically react to a deployment scenario,
        wherein to adjust the operating range of the pico cell one or more triggers for cell-reselection are dynamically decreased or increased in response to the one or more trigger conditions,
        detect user equipment (UE) in a surrounding area based on at least one of a number of physical-random-access channel (PRACH) attempts over a predetermined period of time or interference on a physical uplink shared channel (PUSCH); and
        adjust the operating range of the pico cell proportional to a number of UEs detected in the surrounding area such that the operating range of the pico cell increases or decreases with respective increasing or decreasing UEs detected in the surrounding area; and
    an interface configured to couple the processing circuitry with an antenna configured to communicate with the pico cell.

2. The apparatus of claim 1 wherein the triggers for cell-reselection include a signal transmission power, a reference signal received power (RSRP) and a cell reselection threshold.

3. The apparatus of claim 2 wherein the processing circuitry is to configure the apparatus to:
    detect a coverage region hole or gap by comparing an RSRP of a neighbor pico cell with an RSRP of a serving pico cell, the RSRP for the neighbor pico cell being measured at or near an edge of the serving pico cell; and
    adjust the operating range of the serving pico cell dependent on the number of UEs detected and the RSRP of the neighbor pico cell measured at or near an edge of the serving pico cell to increase the operating range of the serving pico cell in response to detection of the coverage region hole or gap.

4. The apparatus of claim 2 wherein when the pico cell is a serving pico cell deployed for additional capacity within a macro cell, the processing circuitry is to configure the apparatus to:
    compare an RSRP of a neighbor cell with an RSRP of the serving pico cell, the RSRP of the neighbor cell and of the serving pico cell being measured at or near an edge of the serving pico cell; and
    when the neighbor cell is the macro cell, the apparatus is configured to adjust the operating range of the serving pico cell dependent on the number of UEs detected and the RSRP of the neighbor cell.

5. The apparatus of claim 2 wherein the processing circuitry is to configure the apparatus to:
    detect for at least one of excessive or optimal pico cell coverage by comparing an RSRP of a neighbor pico cell and an RSRP of a serving pico cell, the RSRP for the neighbor pico cell being measured at or near an edge of the serving pico cell; and
    adjust an operating range of at least one of the serving pico cell or the neighbor pico cell dependent on the RSRP for the neighbor pico cell and the RSRP of the serving pico cell.

6. The apparatus of claim 2 wherein the processing circuitry is to configure the apparatus to:
    compare an RSRP of a neighbor cell with an RSRP of a serving pico cell, the RSRP of the neighbor cell being measured at or near an edge of the serving pico cell; and
    when the neighbor cell is a macro cell:
        adjust the operating range of the serving pico cell dependent on the RSRP of the neighbor cell and dependent on a sojourn time for UEs at or near the edge of the serving pico cell,
        wherein the operating range of the serving pico cell is decreased to reduce handover attempts from the macro cell to the pico cell.

7. The apparatus of claim 2 wherein to increase the operating range of the pico cell, the apparatus is to:

increase a size of the pico cell by increasing a transmit signal level;

when the transmit signal level is at a maximum transmit signal level able to be supplied by the pico cell, increase an RSRP level; and when the RSRP level is at a maximum RSRP level able to be supplied by the pico cell, decrease a cell reselection (RE) threshold for the pico cell, the cell RE threshold indicating a threshold at which to perform reselection to a target cell.

8. The apparatus of claim 2 wherein to decrease the operating range of the pico cell, the apparatus is to:

increase a cell reselection (RE) threshold for the pico cell, the cell RE threshold indicating a threshold at which to perform reselection to a target cell;

when the cell reselection threshold is at a maximum, decrease an RSRP level; and when the RSRP level is at a minimum RSRP level able to be supplied by the pico cell, decrease a size of the pico cell by decreasing a transmit signal level.

9. The apparatus of claim 1 wherein the eNB is further configured to:

configure the pico cell to detect UE in the surrounding area based on the number of PRACH attempts over the predetermined period of time.

10. The apparatus of claim 1 wherein the eNB is further configured to:

wherein the pico cell is configured to measure the interference on the PUSCH to detect the UEs in the surrounding area.

11. The apparatus of claim 10 wherein to measure the interference on the PUSCH, the pico cell is configured to:

measure interference-over-thermal (IoT) per resource block group (RBG) over time to determine IoT measurements;

determine statistics including a mean, a variance, and a skewness for the IoT measurements; and at least one of decrease or increase the operating range of the pico cell based on the statistics.

12. The apparatus of claim 11 wherein the pico cell is further configured to compare the variance to a second threshold, and when the variance is less than the second threshold, compare the mean to a first threshold and when the mean is less than the first threshold, no UEs are determined to be in the surrounding area, and the pico cell is configured to decrease the operating range of the pico cell, and when the mean is greater than or equal to the first threshold, all UEs are determined to be within the surrounding area and the pico cell is configured to increase the operating range of the pico cell, and when the variance is greater than or equal to the second threshold, compare the skewness to a third threshold, when the skewness is less than the third threshold, a smaller fraction of UEs are determined to be in the surrounding area, and the pico cell is configured to decrease the operating range of the pico cell, and when the skewness is greater than or equal to the third threshold, a greater fraction of UEs are determined to be in the surrounding area, and the pico cell is configured to increase the operating range of the pico cell.

13. In a heterogeneous cellular network comprising at least one macro cell and one or more pico cells wherein the one or more pico cells have coverage regions that are configurable to at least partially overlap a coverage region of the macro cell, a method for operating an eNB comprising processing circuitry, the method comprising:

adjusting an operating range a serving pico cell of the one or more pico cells in response to one or more trigger conditions to dynamically react to a deployment scenario, wherein to adjust the operating range of the serving pico cell, one or more triggers for cell-reselection are dynamically decreased or increased in response to the one or more trigger conditions, wherein the triggers for cell-reselection include at least one of a signal transmission power, a reference signal received power (RSRP) or a cell reselection threshold;

detecting a number of user equipment (UEs) in a surrounding area of the serving pico cell; and adjusting the operating range of the serving pico cell depending on the number of UEs detected in the surrounding area and depending on a RSRP of a neighbor cell measured at or near an edge of the serving pico cell.

14. The method of claim 13 wherein the neighbor cell is a neighbor pico cell, and the method further comprises detecting a coverage region hole or gap by comparing the RSRP of the neighbor pico cell with an RSRP of the serving pico cell.

15. The method of claim 13 wherein:

the neighbor cell is a macro cell, and when the pico cell is deployed for additional capacity within the macro cell, the method further comprises comparing the RSRP of the neighbor cell with an RSRP of the serving pico cell prior to increasing the operating range of the serving pico cell.

16. A non-transitory computer-readable storage medium that stores instructions for execution by one or more processors to perform operations in a heterogeneous cellular network comprising at least one macro cell and one or more pico cells wherein the pico cells have coverage regions that are configurable to at least partially overlap a coverage region of the macro cell, the operations to:

adjust an operating range a serving pico cell of the one or more pico cells in response to one or more trigger conditions to dynamically react to a deployment scenario, wherein to adjust the operating range of the serving pico cell, one or more triggers for cell-reselection are dynamically decreased or increased in response to the one or more trigger conditions, wherein the triggers for cell-reselection include a signal transmission power, a reference signal received power (RSRP) and a cell reselection threshold;

when a neighbor cell is a neighbor pico cell, detect a coverage region hole or gap by comparing an RSRP of the neighbor pico cell with an RSRP of the serving pico cell, the RSRP for the neighbor pico cell being measured at or near an edge of the serving pico cell, and adjust the operating range of the serving pico cell depending on a number of user equipment (UEs) detected in a surrounding area of the serving pico cell and depending on the RSRP of the neighbor pico cell.

17. The non-transitory computer-readable storage medium of claim 16 wherein the operations configure the serving pico cell to when the neighbor cell is a macro cell and the serving pico cell is deployed for additional capacity within the macro cell:

compare the RSRP of the macro cell with the RSRP of the serving pico cell; and adjust the operating range of the serving pico cell dependent on the RSRP of the neighbor cell and dependent on a sojourn time for UEs at or near the edge of the serving pico cell.

* * * * *